United States Patent
Miyasato et al.

(10) Patent No.: US 9,677,639 B2
(45) Date of Patent: Jun. 13, 2017

(54) BI-DIRECTIONAL SHOCK ABSORBING DEVICE

(71) Applicant: SMC CORPORATION, Chiyoda-ku (JP)

(72) Inventors: Eiko Miyasato, Moriya (JP); Youji Takakuwa, Kitakatsushika-gun (JP); Kodai Yoshinaga, Kashiwa (JP); Tsuyoshi Mita, Moriya (JP); Kouichi Matsuzaki, Tsukuba (JP); Toshio Minakuchi, Abiko (JP); Kazuhiro Iida, Toride (JP); Junya Kaneko, Abiko (JP)

(73) Assignee: SMC CORPORATION, Chiyoda-ku (JP)

( * ) Notice: Subject to any disclaimer, the term of this patent is extended or adjusted under 35 U.S.C. 154(b) by 185 days.

(21) Appl. No.: 14/409,680

(22) PCT Filed: May 29, 2013

(86) PCT No.: PCT/JP2013/064886
§ 371 (c)(1),
(2) Date: Dec. 19, 2014

(87) PCT Pub. No.: WO2013/190960
PCT Pub. Date: Dec. 27, 2013

(65) Prior Publication Data
US 2015/0152934 A1 Jun. 4, 2015

(30) Foreign Application Priority Data
Jun. 21, 2012 (JP) ................. 2012-140090

(51) Int. Cl.
| F15B 15/22 | (2006.01) |
| F16F 9/19 | (2006.01) |
| F16F 9/48 | (2006.01) |
| F16F 9/32 | (2006.01) |
| F15B 15/14 | (2006.01) |

(52) U.S. Cl.
CPC ............ *F16F 9/19* (2013.01); *F15B 15/1423* (2013.01); *F15B 15/22* (2013.01); *F15B 15/228* (2013.01); *F16F 9/3214* (2013.01); *F16F 9/483* (2013.01)

(58) Field of Classification Search
CPC ...... F15B 15/204; F15B 15/22; F15B 15/228; F16F 9/348; F16F 9/3488; F16F 9/48; F16F 9/483
See application file for complete search history.

(56) References Cited

U.S. PATENT DOCUMENTS

| 4,453,638 A | 6/1984 | Wallace |
| 5,376,135 A | 12/1994 | Aulie |

(Continued)

FOREIGN PATENT DOCUMENTS

| JP | 52-15965 A | 2/1977 |
| JP | 63-104746 U | 7/1988 |

(Continued)

OTHER PUBLICATIONS

International Search Report issued Jun. 25, 2013 in PCT/JP2013/064886.

(Continued)

*Primary Examiner* — Michael Leslie
(74) *Attorney, Agent, or Firm* — Oblon, McClelland, Maier & Neustadt, L.L.P.

(57) ABSTRACT

A bidirectional shock absorber includes a cylinder housing including a liquid chamber, a shock-absorbing mechanism located inside the liquid chamber and supported by a rod sticking out of the cylinder housing. The shock-absorbing mechanism includes a pair of pistons located in the liquid chamber and attached to the rod on the respective sides of a liquid storage chamber constituting an accumulator, resistance paths formed between an outer circumferential surface (Continued)

of the pistons and an inner circumferential surface of a piston chamber, to apply flow resistance to the liquid, and unidirectional flow paths formed along the respective pistons and configured to block the liquid flow toward the liquid storage chamber when the corresponding piston is pressed toward the piston chamber, but to permit the liquid to flow in the opposite direction.

10 Claims, 3 Drawing Sheets

(56) References Cited

U.S. PATENT DOCUMENTS

| | | | |
|---|---|---|---|
| 7,066,310 B2 | 6/2006 | Mintgen et al. | |
| 8,485,326 B2 | 7/2013 | Miyasato | |
| 9,366,306 B2 * | 6/2016 | Miyasato | F16F 9/483 |

FOREIGN PATENT DOCUMENTS

| | | |
|---|---|---|
| JP | 11-141589 A | 5/1999 |
| JP | 2002-106626 A | 4/2002 |
| JP | 2004-69064 A | 3/2004 |
| SU | 1357621 A1 | 12/1987 |
| WO | WO 2008/139780 A1 | 11/2008 |

OTHER PUBLICATIONS

Russian Office Action issued Jul. 12, 2016 in Patent Application No. 2015101712/11(002526) (with English Translation).

* cited by examiner

BI-DIRECTIONAL SHOCK ABSORBING DEVICE

TECHNICAL FIELD

The present invention relates to a bi-directional shock absorber configured to decelerate or shock-absorbingly stop a movement, in either moving direction, of a single moving member in a reciprocal motion or a pair of relatively moving members that collide with each other while moving toward and away from each other either alternately or randomly.

BACKGROUND ART

A hydraulic buffer disclosed in Patent Literature (PTL) 1 includes a cylinder filled with pressurized hydraulic oil and a piston slidably disposed inside the cylinder so as to divide the cylinder into two oil chambers. A piston rod attached to the piston is led out of the cylinder, and the base portion of the cylinder is connected to a main body side via a mounting bracket, while the piston rod sticking out from the end portion of the cylinder is connected to an oscillating body side via another mounting bracket. The piston includes a passage for communication between the oil chambers and a pair of throttles and a pair of relief valves are provided in the passage, so as to apply attenuation force to the bi-directional flow of the hydraulic oil in the passage communicating between the oil chambers with the throttles and the valves in the piston, thus to attenuate the oscillation of the oscillating body.

The hydraulic buffer also includes an accumulator provided in a part of the space inside of the piston rod, to bias the accumulator piston with a spring to thereby pressurize the hydraulic oil, and the pressurization of the hydraulic oil is intended to increasing the volume elastic modulus of the hydraulic oil. To be more detailed, whereas the volume elastic modulus of the hydraulic oil decreases when air intrudes in the hydraulic oil, the volume elastic modulus is increased by increasing the pressure, and therefore a preload is applied to the hydraulic oil in the cylinder to allow the hydraulic buffer to exhibit a predetermined attenuation characteristic, despite a certain amount of air having intruded in the cylinder.

In the hydraulic buffer according to PTL 1, the pair of throttles and the pair of relief valves are provided in the piston. In addition a passage communicating with the accumulator has to be formed to install a pair of check valves, and further the accumulator and the pressure rod have to be inserted in the piston rod. Accordingly, the piston and the piston rod have to be significantly large in diameter and size, and the internal structure becomes highly complicated. Thus, although the intended purpose may be accomplished with the conceptual configuration shown in the drawings of PTL 1, it is extremely difficult to achieve a realistic design and therefore it is difficult to apply the configuration according to PTL 1 to small-sized fluid pressure cylinders widely employed.

The present inventor has proposed, as disclosed in PTL 2, a hydraulic shock absorber in which a piston chamber is filled in advance with the liquid including an amount to be consumed the chamber, so as to prolong the life span of the shock absorber. Basically, the shock absorber includes a piston provided in the piston chamber in a cylinder tube so as to move in the axial direction with a gap defined between the piston and the inner circumferential surface of the cylinder tube, and a moving object is made to collide with the end portion of a rod attached to the piston and sticking out from the cylinder tube, to thereby shock-absorbingly stop the moving object. The cylinder tube includes a reservoir tank surrounding the rod and in which an elastic member is provided, so that the liquid supplied from a supply hole of the cylinder tube can be stored in the reservoir tank at least with a preload applied to the liquid by the contraction of the elastic member.

Thus, in the shock absorber according to PTL 2 the elastic member provided in the reservoir tank secures a space, by the contraction of the elastic member, for accommodating the liquid flowing out of the piston chamber when the moving object collides with the rod, and the reservoir tank further serves as a chamber for additionally storing in advance the amount of liquid corresponding to the liquid leakage over a long-term use of the shock absorber. For such purpose, the supply hole for supplying the pressurized liquid into the liquid chamber is provided, so as to introduce the liquid subjected to the preload into the reservoir tank from the supply hole, and thus to effectively prolong the life span of the shock absorber.

As stated above, the shock absorber according to PTL 2 is configured to shock-absorbingly stop the moving object that has collided with the end portion of the rod connected to the piston and sticking out of an end portion of the cylinder tube. However, in general, the moving objects to be shock-absorbingly stopped by the shock absorber include a single moving object that reciprocates with respect to a fixed main body of an apparatus, and a pair of relatively moving objects that collide with each other while moving toward and away from each other either alternately or randomly, and in many cases both the reciprocal motion and the relative movement toward and away from each other have to be shock-absorbingly stopped. In such cases, anyway, a pair of shock absorbers capable of shock-absorbingly stopping the moving object against the moving direction of the object have to be provided. In the case where a bi-directional shock absorber having such a function is obtained, the bi-directional shock absorber is expected to be quite broadly applicable, by locating the shock absorber, directly or via a bracket if need be, between the moving object and the fixed main body of the apparatus supporting the moving object, or between the pair of relatively moving objects.

With the bi-directional shock absorber configured as above also, as with the shock absorber according to PTL 2, it is preferable to provide the reservoir tank in which the liquid subjected to the preload can be stored, to thereby effectively prolong the life span of the bi-directional shock absorber, however it is extremely difficult to provide such a bi-directional shock absorber of a highly simplified structure and in a reduced size, instead of merely providing a pair of shock absorbers in opposite directions.

CITATION LIST

Patent Literature

PTL 1: Japanese Unexamined Patent Application Publication No. 2002-106626
PTL 2: International Publication No. 2008/139780

SUMMARY OF INVENTION

Technical Problem

A technical object of the present invention is to provide a bi-directionally operating shock absorber capable of decelerating or shock-absorbingly stopping the movement, in either moving direction, of a single moving member in a reciprocal motion or a pair of relatively moving members that collide with each other while moving toward and away from each other either alternately or randomly, the shock absorber having a reduced number of parts and a simplified structure compared with existing ones, and built in a compact size.

Solution to Problem

Accordingly, the present invention provides a bi-directional shock absorber including a cylinder housing including therein a liquid chamber filled with a liquid, a rod having an end portion located inside the liquid chamber and the other end portion liquid-tightly sticking out of the liquid chamber to outside of the cylinder housing, the rod being disposed so as to reciprocate in the axial direction, and a shock-absorbing mechanism located inside the liquid chamber and supported by the rod, the shock-absorbing mechanism being configured to shock-absorbingly stop a relative movement between the cylinder housing and the rod originating from an external force relatively exerted on the cylinder housing and the rod in a pressing direction or a pulling direction.

The shock-absorbing mechanism includes a first and a second piston supported by the rod at different positions in the axial direction, a first and a second piston chamber respectively defined by the first and the second piston, a liquid storage chamber formed between the first piston and the second piston, resistance paths respectively formed between an outer circumferential surface of the first and the second piston and an inner circumferential surface of the liquid chamber, the resistance paths being configured to apply flow resistance to the liquid, and a first and a second unidirectional flow path respectively connecting between the first and the second piston chamber and the liquid storage chamber. The first and the second unidirectional flow path are openable and closable so that, when the rod is reciprocating, one of the unidirectional flow paths located ahead of the rod in the moving direction is closed so as to block the flow of the liquid flowing from the piston chamber on the forward side in the moving direction toward the liquid storage chamber, and that the other unidirectional flow path located behind the rod in the moving direction is opened so as to allow the liquid to flow from the liquid storage chamber to the piston chamber on the rear side in the moving direction.

In the bi-directional shock absorber thus configured, the rod includes a first and a second partition wall of a flange shape formed with a predetermined clearance therebetween in the axial direction, and the first and the second piston are located adjacent to the respective partition walls on an outer of the clearance, so as to be displaced with respect to the rod in the axial direction, and to alternately abut against and separate from the first and the second partition wall by being displaced by the reciprocal motion of the rod. The first and the second unidirectional flow path each include a communication path formed between an inner circumferential surface of the corresponding piston and an outer circumferential surface the rod so as to constantly allow communication with the corresponding piston chamber, and an open/close path formed between the corresponding partition wall and the corresponding piston to permit and restrict communication between the communication path and the liquid storage chamber, and the open/close path is opened and closed when the corresponding piston separates from and abuts against the corresponding partition wall.

In the present invention, preferably, the first and the second piston may each include a recessed groove formed on a surface opposing the corresponding piston chamber in a radial direction, so as to constantly allow communication between the communication path and the corresponding piston chamber.

In the present invention, the rod may include a shock-absorbing mechanism support member that supports the shock-absorbing mechanism in the liquid chamber and an external force transmitting portion connected to the shock-absorbing mechanism support member and sticking out of the cylinder housing, and the first and the second partition wall and the second piston may be provided on the shock-absorbing mechanism support member, and the first piston may be provided on the external force transmitting portion.

In the present invention, further, it is preferable that an inner diameter of the liquid chamber is largest at a position between the first piston chamber and the second piston chamber, and gradually decreases toward each of the first piston chamber and the second piston chamber.

In a preferred embodiment of the present invention, the liquid storage chamber includes an accumulator constituted of an elastic member formed of an expandable and compressible synthetic resin foam body containing independent voids, and the cylinder housing includes a supply hole for supplying the liquid to the liquid chamber, so that the liquid chamber is filled with the liquid supplied from the supply hole, the liquid being subjected to a preload applied thereto, and the elastic member is compressed by the preload.

The present invention also provides an actuator including the foregoing bi-directional shock absorber. The actuator includes a drive rod driven by a drive mechanism so as to linearly reciprocate, and a moving member driven to reciprocate by the drive rod. The bi-directional shock absorber is attached to the actuator such that the rod of the bi-directional shock absorber reciprocates along an axial line parallel to the drive rod, and the rod of the bi-directional shock absorber is connected to the moving member.

Thus, in the bi-directional shock absorber according to the present invention, the shock-absorbing mechanism provided in the liquid chamber in the cylinder housing is essentially composed of a pair of shock-absorbing pistons attached to the rod on the respective sides of the liquid storage chamber. In addition, the unidirectional flow paths are provided between the respective pistons and the rod or along the respective pistons, the unidirectional flow paths each being configured to restrict the liquid to flow toward the liquid storage chamber when the piston is pressed toward the piston chamber and to permit the liquid to flow from the side of the liquid storage chamber when the piston is pressed in the opposite direction, and the shock-absorbing mechanism thus configured is assembled between the cylinder housing and the rod. Therefore, the shock-absorbing mechanism capable of bi-directionally performing the shock-absorbing operation can be obtained with an extremely simple configuration.

Advantageous Effects of Invention

The bi-directional shock absorber according to the present invention is capable of decelerating or shock-absorbingly stopping the movement, in either moving direction, of a single moving member in a reciprocal motion or a pair of relatively moving members that collide with each other while moving toward and away from each other either alternately or randomly. In addition, the shock absorber has a simplified structure with a reduced number of parts, and can be built in a compact size.

Further, the foregoing bi-directional shock absorber, having the simplified structure and the compact size, is also applicable to the case of providing an accumulator in the liquid chamber filled with a liquid such as mineral oil to make up the consumption of the liquid for the purpose of prolonging the life span of the shock absorber.

DESCRIPTION OF EMBODIMENTS

Figure 1:
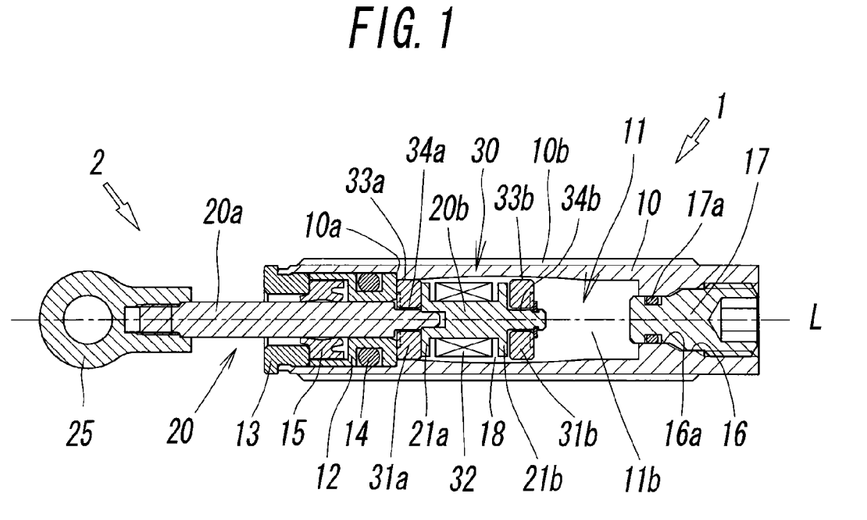
FIG. 1 is a vertical cross-sectional view showing a configuration of a bi-directional shock absorber according to a first embodiment of the present invention.
Figure 2:
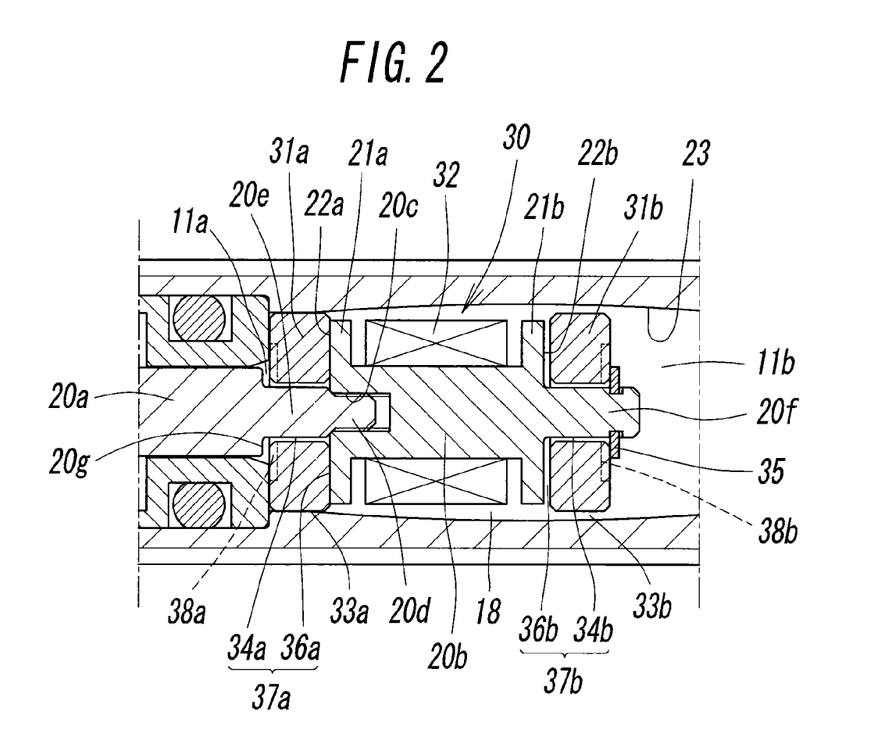
FIG. 2 is an enlarged cross-sectional view of an essential part of FIG. 1.
Figure 3:
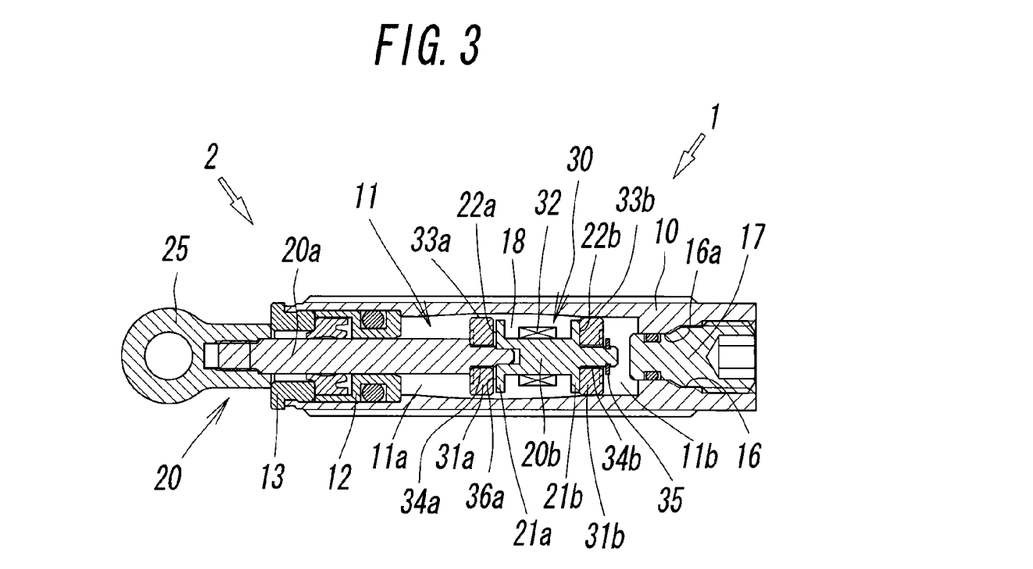
FIG. 3 is a vertical cross-sectional view showing a different operating position according to the first embodiment.

FIG. 1 to FIG. 3 illustrate a bi-directional shock absorber according to a first embodiment of the present invention. The bi-directional shock absorber is configured to decelerate or shock-absorbingly stop the movement, in either moving direction, of a single moving member in a reciprocal motion or a pair of relatively moving members that collide with each other while moving toward and away from each other either alternately or randomly, and generally connected to or incorporated in an actuator that causes a moving member to reciprocate with fluid pressure or other types of power or an apparatus reciprocally driven by the actuator. However, the purpose of use of the bi-directional shock absorber is not limited to the mentioned example.

The bi-directional shock absorber according to the first embodiment will be described in details. The shock absorber includes a first member 1 constituted of a cylinder housing 10 including a liquid chamber 11 of a circular cylindrical shape filled with a liquid such as mineral oil, and a second member 2 constituted of a circular column-shaped rod 20 disposed inside the liquid chamber 11 of the first member 1 and supporting a shock-absorbing mechanism 30, and an end portion of the second member 2 liquid-tightly sticks out from an end portion of the liquid chamber 11 along an axial line L, to an outer region of the cylinder housing 10. The shock-absorbing mechanism 30 is configured, as will be subsequently described in details, to shock-absorbingly stop a relative movement between the first member 1 and the second member 2 created by an external force relatively exerted on these members in a pressing direction and a pulling direction.

An end portion of the cylindrical liquid chamber 11 in the cylinder housing 10 of the first member 1 in the direction along the axial line L, along which the rod 20 sticks out, is closed with a retainer 12 that serves as a base for seal members 14, 15 and also a bearing, the retainer 12 being fixed with a cover 13. To be more detailed, the seal member 14 which is an O-ring is fitted in an annular groove formed on an outer circumferential surface of the retainer 12 on the side of the liquid chamber 11, so as to seal between the outer circumferential surface of the retainer 12 and the inner circumferential surface of the cylinder housing 10. In addition, the seal member 15 is disposed in the space between the inner circumferential surface of the retainer 12 on the side of the cover 13 and the outer circumferential surface of the rod 20, in contact with the inner circumferential surface of the cover 13 and the outer circumferential surface of the rod 20, and thus the end portion of the cylinder housing 10 from which the rod sticks out is liquid-tightly closed with the seal members 14, 15. The end portion of the cylinder housing 10 is swaged so as to fit in a recess formed on the outer circumference of the cover 13 inserted in the end portion of the cylinder housing 10, so that the retainer 12 is held and fixed between the cover 13 and a stepped portion 10a in the cylinder housing 10.

On the other hand, the cylinder housing 10 includes a supply hole 16 for introducing the liquid such as mineral oil into the liquid chamber 11, formed in the other end portion with an opening on the outer surface of the liquid chamber 11, and the supply hole 16 is closed with a pressure regulation plug 17. Although the supply hole 16 is provided for filling the liquid chamber 11 with the liquid such as mineral oil, it is preferable to utilize the supply hole 16 to apply a preload to the liquid in the liquid chamber 11 as will be subsequently described. Accordingly, a cylindrical portion 16a is formed on the inner region of the supply hole 16 and an O-ring 17a is provided around the pressure regulation plug 17 so as to seal the cylindrical portion 16a. Then upon squeezing the pressure regulation plug 17 into the supply hole 16 so as to press the liquid in the cylindrical portion 16a of the supply hole 16 deeper into the liquid chamber 11 with the O-ring 17a, the preload can be applied to the liquid in the liquid chamber 11.

Further, the cylinder housing 10 constituting the first member 1 includes, like the existing shock absorbers, a helical groove 10b formed around the cylinder housing 10, which serves as a fixing device to attach the shock absorber to a predetermined position of an actuator or the like that causes a moving member, the object to be shock-absorbingly stopped, to reciprocate. However, the cylinder housing 10 can be fixed with an appropriately chosen device to the main body of an apparatus that includes a moving member to be shock-absorbingly stopped, as will be subsequently described.

The rod 20, constituting the second member 2 supporting the shock-absorbing mechanism 30 in the liquid chamber 11 in the cylinder housing 10 constituting the first member 1, includes an external force transmitting portion 20a liquid-tightly sticking out from the liquid chamber 11 along the axial line L of the cylinder housing 10 to a region outside of the cylinder housing 10, and a shock-absorbing mechanism support member 20b supporting the shock-absorbing mechanism 30 in the liquid chamber 11, as stated above. In the illustrated example, the external force transmitting portion 20a and the shock-absorbing mechanism support member 20b are formed independently from each other, and combined together by screwing a male thread portion 20d formed at the tip portion of the external force transmitting portion 20a into a threaded hole 20c formed in the shock-absorbing mechanism support member 20b. However, the external force transmitting portion 20a and the shock-absorbing mechanism support member 20b may be integrally formed from a single member to constitute the rod 20, and three or more components may be combined to form the rod 20.

Here, an attaching device 25 provided on the end portion of the rod 20 sticking out of the cylinder housing 10 is intended for attaching a fixing member to be fixed to a moving member at a position to stop the moving member, when the cylinder housing 10 of the bi-directional shock absorber is attached to an actuator or the like that drives the moving member to be shock-absorbingly stopped, and therefore an appropriate shape may be adopted according to the type pf the moving member to be shock-absorbingly stopped.

The shock-absorbing mechanism 30 supported at the inner end portion of the rod 20 in the liquid chamber 11 serves, as stated above, to shock-absorbingly stop the relative movement between the first member 1 and the second member 2 originating from an external force exerted thereon in the pressing direction and pulling direction, and includes a first and a second piston 31a, 31b for shock absorbing each having an annular shape and attached around a portion of the rod 20 located inside the liquid chamber 11 so as to oppose each other along the axial line L of the rod 20 across the liquid storage chamber 18, and an accumulator 32 constituted of an expandable and compressible elastic member located in the liquid storage chamber 18 formed between the pair of pistons 31a, 31b. The liquid storage chamber 18 is formed between a first and a second partition wall 21a, 21b of a flange shape attached to the rod 20 with a spacing therebetween along the axial line L, and the pistons 31a, 31b are located on the outer side of the liquid storage chamber 18, so as to respectively oppose abutment surfaces 22a, 22b of the partition walls 21a, 21b oriented to the outer side of the liquid storage chamber 18. The pistons 31a, 31b are larger in diameter than the partition walls 21a, 21b. The abutment surfaces 22a, 22b are flat, and the inner surfaces of the pistons 31a, 31b respectively opposing the abutment surface 22a, 22b are also flat.

In the case where the rod 20 is constituted of the external force transmitting portion 20a and the shock-absorbing mechanism support member 20b independently formed as in the illustrated embodiment, the liquid storage chamber 18 is formed between the pair of partition walls 21a, 21b provided on the end portions of the shock-absorbing mechanism support member 20b, however in the case where the rod 20 is constituted of a single member or an appropriate number of parts combined, a structure corresponding to the partition walls 21a, 21b is provided on the rod 20.

In the liquid chamber 11, a region defined by the first piston 31a in which the first piston 31a reciprocates together with the rod 20 will be referred to as first piston chamber 11a, and a region defined by the second piston 31b in which the second piston 31b reciprocates together with the rod 20 will be referred to as second piston chamber 11b. Between the outer circumferential surface of the pistons 31a, 31b and the inner circumferential surface 23 of the liquid chamber 11, more specifically the piston chambers 11a, 11b, resistance paths 33a, 33b are defined. The resistance paths 33a, 33b serve to apply a flow resistance to the liquid when the liquid in the piston chambers 11a, 11b is pressurized by the pistons 31a, 31b so as to flow toward the liquid storage chamber 18 on the back of the pistons 31a, 31b.

The resistance paths 33a, 33b are defined by adjusting the shape of the inner circumferential surface 23 of the piston chambers 11a, 11b. The resistance paths 33a, 33b may be formed so as to apply the same flow resistance to the liquid flowing around the pistons 31a, 31b, however in the case where, in particular, the kinetic energy of the moving member bi-directionally moving differs largely, the shape of the inner circumferential surface 23 of the piston chambers 11a, 11b may be arranged so as to apply different flow resistances to the liquid flowing toward the liquid storage chamber 18, to thereby apply different shock-absorbing effects to the pistons 31a, 31b according to the kinetic energy of the moving member.

In the illustrated example of the arrangement of the shape of the inner circumferential surface 23 of the piston chambers 11a, 11b, the inner diameter of the liquid chamber 11 of a cylindrical shape is made largest in a portion between the first piston chamber 11a and the second piston chamber 11b, and gradually reduced toward the first piston chamber 11a and the second piston chamber 11b, respectively. Although the inner diameter of the liquid chamber 11 is arranged so as to vary in a curved shape in the illustrated example, the inner diameter may be arranged to vary linearly. In addition, arranging the inner diameter of the liquid chamber 11 so as to vary in different patterns between the piston chambers 11a, 11b allows different braking forces to be applied to the respective pistons 31a, 31b in the reciprocal motion thereof. Alternatively, the inner diameter of the liquid chamber 11 may be constant over the entire length.

Out of the pair of pistons 31a, 31b, the first piston 31a is located at a piston attaching portion 20e connected to the shock-absorbing mechanism support member 20b at the inner end portion of the external force transmitting portion 20a of the rod 20, and the second piston 31b is located at a piston attaching portion 20f formed on the tip portion of the shock-absorbing mechanism support member 20b of the rod 20. In addition, communication paths 34a, 34b each formed in a fine groove shape are provided between the inner circumferential surface of the piston 31a, 31b and the outer circumferential surface of the piston attaching portion 20e of the external force transmitting portion 20a and the piston attaching portion 20f of the shock-absorbing mechanism support member 20b, for constant communication between the front side and the rear side of the piston 31a, 31b. Thus, the first piston 31a is fitted via the communication path 34a onto the piston attaching portion 20e formed in a reduced diameter on the external force transmitting portion 20a, and the second piston 31b is fitted via the communication path 34b onto the piston attaching portion 20f formed in a reduced diameter on the shock-absorbing mechanism support member 20b, and prevented from falling off from the piston attaching portion 20f by a stopper ring 35.

The communication paths 34a, 34b constitute a first and a second unidirectional flow path 37a, 37b for allowing and restricting communication between the piston chambers 11a, 11b and the liquid storage chamber 18 according to the movement of the pistons 31a, 31b, in collaboration with open/close paths 36a, 36b to be subsequently described. Accordingly, the pistons 31a, 31b are fixed to neither of the external force transmitting portion 20a and the shock-absorbing mechanism support member 20b, and slightly movable along the axial line L along the piston attaching portions 20e, 20f, and the communication paths 34a, 34b of the respective pistons 31a, 31b allow communication between the front side and the rear side of the pistons 31a, 31b.

In addition, the open/close paths 36a, 36b, to be respectively opened and closed by the movement of the pistons 31a, 31b to and from the abutment surfaces 22a, 22b, are formed between the abutment surfaces 22a, 22b of the partition walls 21a, 21b and the inner surfaces of the pistons 31a, 31b. The open/close paths 36a, 36b respectively communicate with an end portion of the communication paths 34a, 34b, so that the open/close paths 36a, 36b and the communication paths 34a, 34b respectively constitute the unidirectional flow paths 37a, 37b formed parallel to the resistance paths 33a, 33b.

When the piston 31a or 31b is abutted against the abutment surface 22a or 22b, the open/close path 36a or 36b is closed and hence the unidirectional flow path 37a or 37b is closed, and therefore the communication between the piston chamber 11a or 11b and the liquid storage chamber 18 through the unidirectional flow path 37a or 37b is disconnected. On the contrary, when the piston 31a or 31b is separated from the abutment surface 22a or 22b, the open/close path 36a or 36b opened and hence the unidirectional flow path 37a or 37b is opened, and therefore the communication between the piston chamber 11a or 11b and the liquid storage chamber 18 is secured through the unidirectional flow path 37a or 37b. Accordingly, the pistons 31a, 31b are supported by the rod 20 so as to move in the axial direction, within a range necessary for contacting and separating from the abutment surfaces 22a, 22b thus to open and close the communication paths 34a, 34b, respectively.

The pistons 31a, 31b each include a recessed groove 38a, 38b formed on the surface opposite to the partition wall 21a, 21b so as to radially extend from the communication path 34a, 34b, so as to constantly allow communication between the communication paths 34a, 34b and the piston chamber 11a, 11b through the recessed grooves 38a, 38b, respectively, even when the piston 31a or 31b is abutted against a stepped portion 20g formed at the base portion of the piston attaching portion 20e of the rod 20, or the stopper ring 35.

In this embodiment, as stated above, the rod 20 is constituted of the external force transmitting portion 20a and the shock-absorbing mechanism support member 20b which are separate components, so that the pistons 31a, 31b can be supported by the rod 20 so as to move along the axial line L with a simplified structure. However, in the case where the rod 20 is constituted of a single member or an appropriate number of parts combined, not only a structure corresponding to the partition walls 21a, 21b has to be provided on the rod 20, but also a structure corresponding to the unidirectional flow path has to be provided between each of the pistons 31a, 31b and the rod 20, or on the pistons 31a, 31b.

Alternatively, the unidirectional flow paths 37a, 37b respectively associated with the pistons 31a, 31b may be achieved, for example, by providing on each of the pistons 31a, 31b a check valve that only allows one-way flow of the liquid, in which case, in particular, the pistons 31a, 31b do not have to be moved to and from the abutment surfaces 22a, 22b so as to open and close the communication path, and hence the pistons 31a, 31b can be simply fixed to the rod 20.

Figure 4:
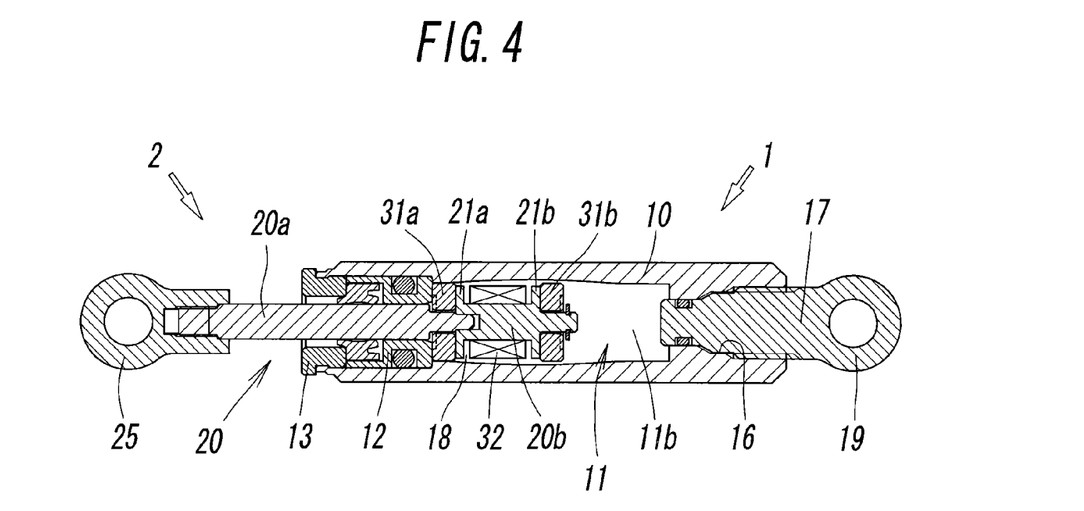
FIG. 4 is a vertical cross-sectional view showing a configuration of a bi-directional shock absorber according to a second embodiment of the present invention.

Now, a bidirectional shock absorber according to a second embodiment shown in FIG. 4 is configured similarly to the first embodiment except for the aspects described hereunder. In the second embodiment, a structure corresponding to the helical groove 10b according to the first embodiment is not provided around the cylinder housing 10 constituting the first member 1. Instead, the pressure regulation plug 17, located at the end portion of the cylinder housing 10 opposite to the projecting rod 20 and covering the supply hole 16 for supplying the liquid such as mineral oil into the liquid chamber 11, is formed so as to extend to an outer region so that the extended portion can be utilized to rotate the pressure regulation plug 17, and to include a fixing member 19 for attaching the cylinder housing 10 constituting the first member 1 to a predetermined position of the actuator or the like that drives the moving member to be shock-absorbingly stopped.

Here, the second embodiment is basically the same as the first embodiment except for the mentioned configuration and the working described hereunder. Accordingly, the essential components illustrated in FIG. 4 are given the same numeral as those of the first embodiment, and the description thereof will not be repeated.

Hereunder, the working of the bi-directional shock absorber configured as above will be described. In the state shown in FIG. 1 and FIG. 2, when a force originating from the collision of the moving member against the attaching device 25 attached to the outer end portion of the rod 20 is exerted in the direction to press the rod 20 into the cylinder housing 10 (to the right in FIGS. 1 and 2), the liquid in the second piston chamber 11b is pressurized by the second piston 31b on the forward side in the moving direction of the rod 20, and therefore the second piston 31b is pressed against the second partition wall 21b so that the open/close path 36b between the second piston 31b and the second partition wall 21b is closed, and the second unidirectional flow path 37b on the side of the second piston 31b is closed. Accordingly, the liquid in the second piston chamber 11b flows out into the liquid storage chamber 18 through the resistance path 33b around the second piston 31b and, as shown in FIG. 3, although a part of the liquid that has flowed into the liquid storage chamber 18 remains in the liquid storage chamber 18, the majority of that liquid flows out from the liquid storage chamber 18 into the first piston chamber 11a on the opposite side through the first unidirectional flow path 37a including the open/close path 36a and the communication path 34a because the first piston 31a on the rear side in the moving direction of the rod 20 is moved so as to open the open/close path 36a between the first piston 31a and the first partition wall 21a. During such a process, the rod 20 is decelerated by the flow resistance applied to the liquid in the resistance path 33b around the second piston 31b, and then shock-absorbingly stopped.

It is a matter of course that when the moving member exerts the collision force on the rod 20 in the opposite direction the rod 20 and the pistons 31a, 31b operate in the direction opposite to the description given above.

Here, the accumulator 32 is constituted of the expandable and compressible elastic member, to be expanded and compressed in compliance with the fluctuation of the volume inside the liquid chamber 11 originating from the movement of the rod 20 into and out of the liquid chamber 11, provided in the liquid storage chamber 18 and around the rod 20, so that the elastic member absorbs the fluctuation of the volume and the amount of the liquid in the liquid chamber 11. In addition to the mentioned configuration, the cylinder housing 10 includes the supply hole 16 through which the liquid can be supplied into the liquid chamber 11 with a pressure so that the liquid can be introduced with a preload applied thereto, from the supply hole 16 into the liquid chamber 11. Accordingly, the liquid subjected to the preload can be stored in the liquid chamber 11 with the elastic member provided in the liquid storage chamber 18 in the compressed state, and therefore the life span of the bi-directional shock absorber can be prolonged with the liquid introduced with the preload, even though the amount of the liquid in the liquid chamber 11 decreases owing to a long-term use.

The bi-directional shock absorber configured as above serves, as already described, to decelerate or shock-absorbingly stop the movement, in either moving direction, of a single moving member in a reciprocal motion or a pair of relatively moving members that collide with each other while moving toward and away from each other either alternately or randomly. In a practical use, for example, the bi-directional shock absorber may be applied to an actuator such as a fluid pressure cylinder, and in the case of shock-absorbingly stop the reciprocal motion of a moving member connected to the drive rod of the actuator, the cylinder housing 10 constituting the first member 1 may be fixed to a casing of the actuator, or a part of the casing of the actuator may be utilized as the cylinder housing 10, in which case the first member 1 of the bi-directional shock absorber is mounted inside the actuator.

The moving member is connected, via the attaching device 25 or another attaching device formed according to the type of the actuator, to the end portion of the rod 20 of the second member 2 sticking out of the cylinder housing 10 fixed to or mounted in the casing of the actuator, as described above.

Figure 5:
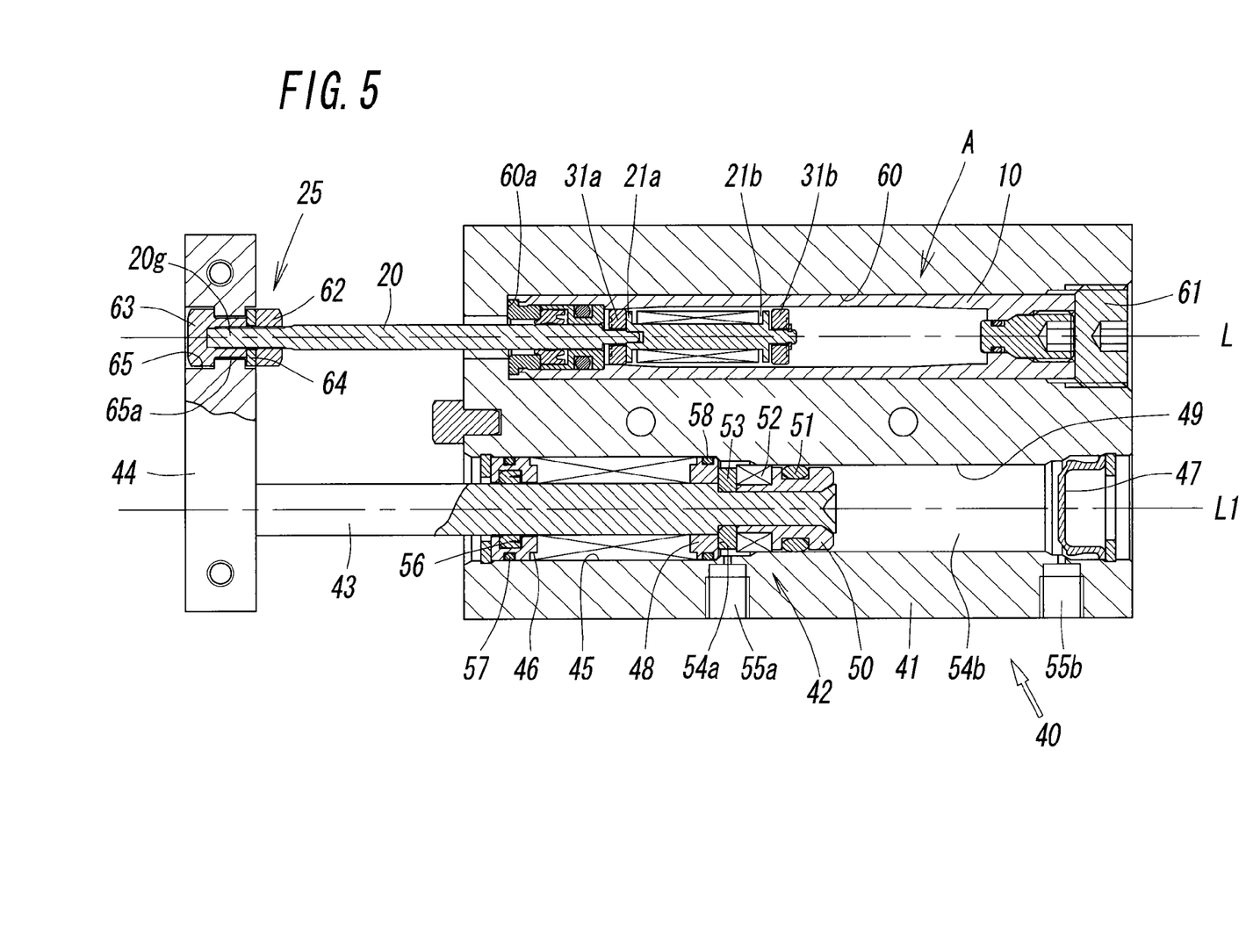
FIG. 5 is a cross-sectional view showing an example of an actuator including the bi-directional shock absorber.

FIG. 5 illustrates a fluid pressure cylinder 40 exemplifying the actuator in which the bi-directional shock absorber is incorporated. In the following description, the bi-directional shock absorber will be denoted by a reference code A.

The fluid pressure cylinder 40 includes a drive mechanism 42 and the bi-directional shock absorber A disposed parallel to each other inside a casing 41, and the outer end portion of the rod 20 of the bi-directional shock absorber A is connected to a moving member 44 fixed to the outer end portion of a drive rod 43 of the drive mechanism 42.

The drive mechanism 42 includes a cylinder cavity 45 extending inside the casing 41 along the axial line L1, a first blocking member 46 air-tightly sealing an end portion of the cylinder cavity 45, a second blocking member 47 air-tightly sealing the other end portion of the cylinder cavity 45, an intermediate partition member 48 provided between the first blocking member 46 and the second blocking member 47, a drive piston chamber 49 defined between the intermediate partition member 48 and the second blocking member 47, a drive piston 50 disposed inside the drive piston chamber 49 so as to slide along the axial line L1, and the drive rod 43 having the inner end portion connected to the drive piston 50. The drive rod 43 is disposed so as to penetrate through the intermediate partition member 48 and to air-tightly penetrate through the first blocking member 46, and the end portion of the drive rod 43 sticks out of the cylinder cavity 45 and connected to the moving member 44.

The drive piston 50 includes a seal member 51 that seals between the outer circumferential surface of the drive piston 50 and the inner circumferential surface of the drive piston chamber 49, and a guide ring 52 that guides the sliding motion of the drive piston 50, and a fixing member 53 that fixes the guide ring 52. A first pressure chamber 54a is defined between the drive piston 50 and the intermediate partition member 48, and a second pressure chamber 54b is defined between the drive piston 50 and the second blocking member 47. The first and the second pressure chamber 54a, 54b are respectively connected to a first and a second port 55a, 55b.

When a pressure fluid such as compressed air is supplied into the first pressure chamber 54a through the first port 55a and the pressure fluid in the second pressure chamber 54b is discharged through the second port 55b in the state shown in FIG. 5, the drive piston 50 and the drive rod 43 are displaced to the right in FIG. 5 and the moving member 44 is driven to the right, and when the pressure fluid is supplied and discharged in the opposite direction the drive piston 50 and the drive rod 43 are displaced to the left in FIG. 5 and the moving member 44 is driven to the left.

In FIG. 5, a reference numeral 56 designates a seal member attached to the inner circumferential surface of the first blocking member 46 so as to seal between the inner circumferential surface of the first blocking member 46 and the outer circumferential surface of the drive rod 43, a numeral 57 designates a seal member attached to the outer circumferential surface of the first blocking member 46 so as to seal between the outer circumferential surface of the first blocking member 46 and the inner circumferential surface of the cylinder cavity 45, and a numeral 58 designates a seal member attached to the outer circumferential surface of the intermediate partition member 48 so as to seal between the outer circumferential surface of the intermediate partition member 48 and the inner circumferential surface of the cylinder cavity 45.

The bi-directional shock absorber is accommodated in a mounting cavity 60 formed in the casing 41 so as to extend parallel to the cylinder cavity 45, in such an orientation that the an portion of the cylinder housing 10 is abutted against an end wall 60a formed on an end portion of the mounting cavity 60, and fixed inside the mounting cavity 60 by a fixing plug 61 screwed into the other end portion of the mounting cavity 60 thus to be pressed against the other end portion of the cylinder housing 10. The rod 20 of the bi-directional shock absorber sticks out from the casing 41 parallel to the drive rod 43, and the outer end portion of the rod 20 is connected to the moving member 44 with the attaching device 25.

The attaching device 25 is configured differently from the one shown in FIG. 1, and includes a first and a second nut 62, 63 engaged with a threaded portion 20g formed on the outer end portion of the rod 20, and a stopper ring 64 located between the nuts 62, 63. The rod 20 is connected to the moving member 44 by inserting the outer end potion of the rod 20, to which the first nut 62 and the stopper ring 64 are attached, into a rod connection hole 65 formed in the moving member 44, and screwing the second nut 63 onto the outer end portion of the rod 20 so as to hold a ring-shaped fixing wall 65a of the rod connection hole 65 between the second nut 63 and the stopper ring 64.

With the aforementioned configuration, the bi-directional shock absorber can shock-absorbingly stop, in either direction, the reciprocal motion of the moving member 44 driven by the drive mechanism 42 of the fluid pressure cylinder 40.

In the case where the bi-directional shock absorber is utilized for a pair of moving members 44 that collide with each other while randomly moving, it is preferable exert a biasing force of a return spring on the rod 20 if need be, so that the shock-absorbing mechanism 30 can constantly return to the central portion of the liquid chamber 11.

REFERENCE SIGNS LIST

10 Cylinder Housing
11 Liquid Chamber
11a, 11b Piston Chamber
16 Supply Hole
18 Liquid Storage Chamber
20 Rod
20a External Force Transmitting Portion
20b Shock-Absorbing Mechanism Support Member
21a, 21b Partition Wall
30 Shock-Absorbing Mechanism
31a, 31b Piston
32 Accumulator
33a, 33b Resistance Path
34a, 34b Communication Path
36a, 36b Open/Close Path
37a, 37b Unidirectional Flow Path
38a, 38b Recessed Groove
42 Drive Mechanism
43 Drive Rod
44 Moving Member
L, L1 Axial Line

The invention claimed is:

1. A bidirectional shock absorber comprising: a cylinder housing including therein a liquid chamber filled with a liquid; a rod having an end portion located inside the liquid chamber and the other end portion liquid-tightly sticking out of the liquid chamber to outside of the cylinder housing, the rod being disposed so as to reciprocate in an axial direction; and a shock-absorbing mechanism located inside the liquid chamber and supported by the rod, the shock-absorbing mechanism being configured to shock-absorbingly stop a relative movement between the cylinder housing and the rod originating from an external force relatively exerted on the cylinder housing and the rod in a pressing direction or a pulling direction, wherein the shock-absorbing mechanism includes: a first and a second piston which are able to be displaced separately in the axial direction on the rod by the action of liquid pressure, and which are supported by the rod at different positions in the axial direction; a first and a second piston chamber respectively defined by the first and the second piston; a liquid storage chamber formed between the first piston and the second piston; resistance paths respectively formed between an outer circumferential surface of the first and the second piston and an inner circumferential surface of the liquid chamber, the resistance paths being configured to apply flow resistance to the liquid; and a first and a second unidirectional flow path respectively connecting between the first and the second piston chamber and the liquid storage chamber, the first and the second unidirectional flow paths are openable and closable by displacement of the first and the second pistons with respect to the rod and, when the rod is reciprocating, one of the unidirectional flow paths located ahead of the rod in the moving direction is closed by displacement, with respect to the rod, of the respective piston located on the forward side in the moving direction, so as to block the flow of the liquid flowing from the piston chamber on the forward side in the moving direction toward the liquid storage chamber, and that the other unidirectional flow path located behind the rod in the moving direction is opened by displacement, with respect to the rod, of the respective piston located on the rear side in the moving direction, so as to allow the liquid to flow from the liquid storage chamber to the piston chamber on the rear side in the moving direction.

2. The bidirectional shock absorber according to claim 1, wherein the rod includes a first and a second partition walls of a flange shape formed with a predetermined clearance therebetween in the axial direction, the first and the second piston are located adjacent to the respective partition walls on an outer of the clearance, so as to be displaced with respect to the rod in the axial direction, and to alternately abut against and separate from the first and the second partition walls by being displaced by the reciprocal motion of the rod, and the first and the second unidirectional flow path each include a communication path formed between an inner circumferential surface of the corresponding piston and an outer circumferential surface the rod so as to constantly allow communication with the corresponding piston chamber, and an open/close path formed between the corresponding partition wall and the corresponding piston to permit and restrict communication between the communication path and the liquid storage chamber, and the open/close path is opened and closed when the corresponding piston separates from and abuts against the corresponding partition wall.

3. The bidirectional shock absorber according to claim 2, wherein the first and second piston each include a recessed groove formed in a radial direction on a surface opposing the corresponding piston chamber, so as to constantly allow communication between the communication path and the corresponding piston chamber.

4. The bidirectional shock absorber according to claim 1, wherein an inner diameter of the liquid chamber is largest at a position between the first piston chamber and the second piston chamber, and gradually decreases toward each of the first piston chamber and the second piston chamber.

5. The bidirectional shock absorber according to claim 1, wherein the liquid storage chamber includes an accumulator constituted of an elastic member formed of an expandable and compressible synthetic resin foam body containing independent voids, and the cylinder housing includes a supply hole for supplying the liquid to the liquid chamber, so that the liquid chamber is filled with the liquid supplied from the supply hole, the liquid being subjected to a preload applied thereto, and the elastic member is compressed by the preload.

6. An actuator with bidirectional shock absorber, comprising the bidirectional shock absorber according to claim 1, the actuator further comprising: a drive rod driven by a drive mechanism so as to linearly reciprocate; and a moving member driven to reciprocate by the drive rod, wherein the bidirectional shock absorber is attached to the actuator such that the rod of the bidirectional shock absorber reciprocates along an axial line parallel to the drive rod, and the rod of the bidirectional shock absorber is connected to the moving member.

7. The bidirectional shock absorber according to claim 2, wherein the rod includes: a shock-absorbing mechanism support member that supports the shock-absorbing mechanism in the liquid chamber; and an external force transmitting portion connected to the shock-absorbing mechanism support member and sticking out of the cylinder housing, and the first and the second partition walls and the second piston are provided on the shock-absorbing mechanism support member, and the first piston is provided on the external force transmitting portion.

8. The bidirectional shock absorber according to claim 3, wherein the rod includes: a shock-absorbing mechanism support member that supports the shock-absorbing mechanism in the liquid chamber; and an external force transmitting portion connected to the shock-absorbing mechanism support member and sticking out of the cylinder housing, and the first and the second partition walls and the second piston are provided on the shock-absorbing mechanism support member, and the first piston is provided on the external force transmitting portion.

9. The bidirectional shock absorber according to claim 2, wherein an inner diameter of the liquid chamber is largest at a position between the first piston chamber and the second piston chamber, and gradually decreases toward each of the first piston chamber and the second piston chamber.

10. The bidirectional shock absorber according to claim 3, wherein an inner diameter of the liquid chamber is largest at a position between the first piston chamber and the second piston chamber, and gradually decreases toward each of the first piston chamber and the second piston chamber.

* * * * *